(12) United States Patent
Bicknell et al.

(10) Patent No.: US 7,526,684 B2
(45) Date of Patent: Apr. 28, 2009

(54) DETERMINISTIC PREVENTIVE RECOVERY FROM A PREDICTED FAILURE IN A DISTRIBUTED STORAGE SYSTEM

(75) Inventors: Bruce Allen Bicknell, Mound, MN (US); Mark Allen Gaertner, Vadnais Heights, MN (US); Paul William Burnett, Savage, MN (US); Robert John German, Jordan, MN (US); Robert George Bean, Monument, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 666 days.

(21) Appl. No.: 11/040,410

(22) Filed: Jan. 21, 2005

(65) Prior Publication Data

US 2005/0216800 A1 Sep. 29, 2005

Related U.S. Application Data

(60) Provisional application No. 60/555,879, filed on Mar. 24, 2004.

(51) Int. Cl.
*G06F 11/00* (2006.01)
(52) U.S. Cl. .................................................. 714/47
(58) Field of Classification Search .................. 714/47, 714/1, 40, 42, 48
See application file for complete search history.

(56) References Cited

U.S. PATENT DOCUMENTS

| | | | | |
|---|---|---|---|---|
| 5,717,850 | A * | 2/1998 | Apperley et al. | 714/6 |
| 5,721,816 | A | 2/1998 | Kusbel et al. | |
| 5,832,199 | A * | 11/1998 | Apperley et al. | 714/6 |
| 5,832,204 | A * | 11/1998 | Apperley et al. | 714/42 |
| 6,401,214 | B1 * | 6/2002 | Li | 714/6 |
| 6,415,189 | B1 | 7/2002 | Hajji | |
| 6,460,151 | B1 * | 10/2002 | Warwick et al. | 714/718 |
| 6,571,354 | B1 * | 5/2003 | Parks et al. | 714/7 |
| 6,606,210 | B1 | 8/2003 | Coker et al. | |
| 6,611,393 | B1 | 8/2003 | Nguyen et al. | |
| 6,738,757 | B1 | 5/2004 | Wynne et al. | |
| 6,760,174 | B2 | 7/2004 | Forehand | |
| 6,771,440 | B2 | 8/2004 | Smith | |
| 6,832,236 | B1 | 12/2004 | Hamilton, II et al. | |
| 2002/0053046 | A1 | 5/2002 | Gray et al. | |
| 2003/0182136 | A1 | 9/2003 | Horton | |
| 2004/0051988 | A1 | 3/2004 | Jing et al. | |
| 2004/0103246 | A1 * | 5/2004 | Chatterjee et al. | 711/114 |

* cited by examiner

*Primary Examiner*—Nadeem Iqbal
(74) *Attorney, Agent, or Firm*—Fellers, Snider et al.

(57) ABSTRACT

A data storage subsystem in a distributed storage system having a plurality of predictive failure analyzing data storage devices. The subsystem furthermore has a circuit that is responsive to a predicted failure indication by a data storage device in relation to predetermined rules stored in memory for deterministically initiating a preventive recovery either by a data recovery procedure in the data storage device or by a fault tolerance storage arrangement in the subsystem.

19 Claims, 4 Drawing Sheets

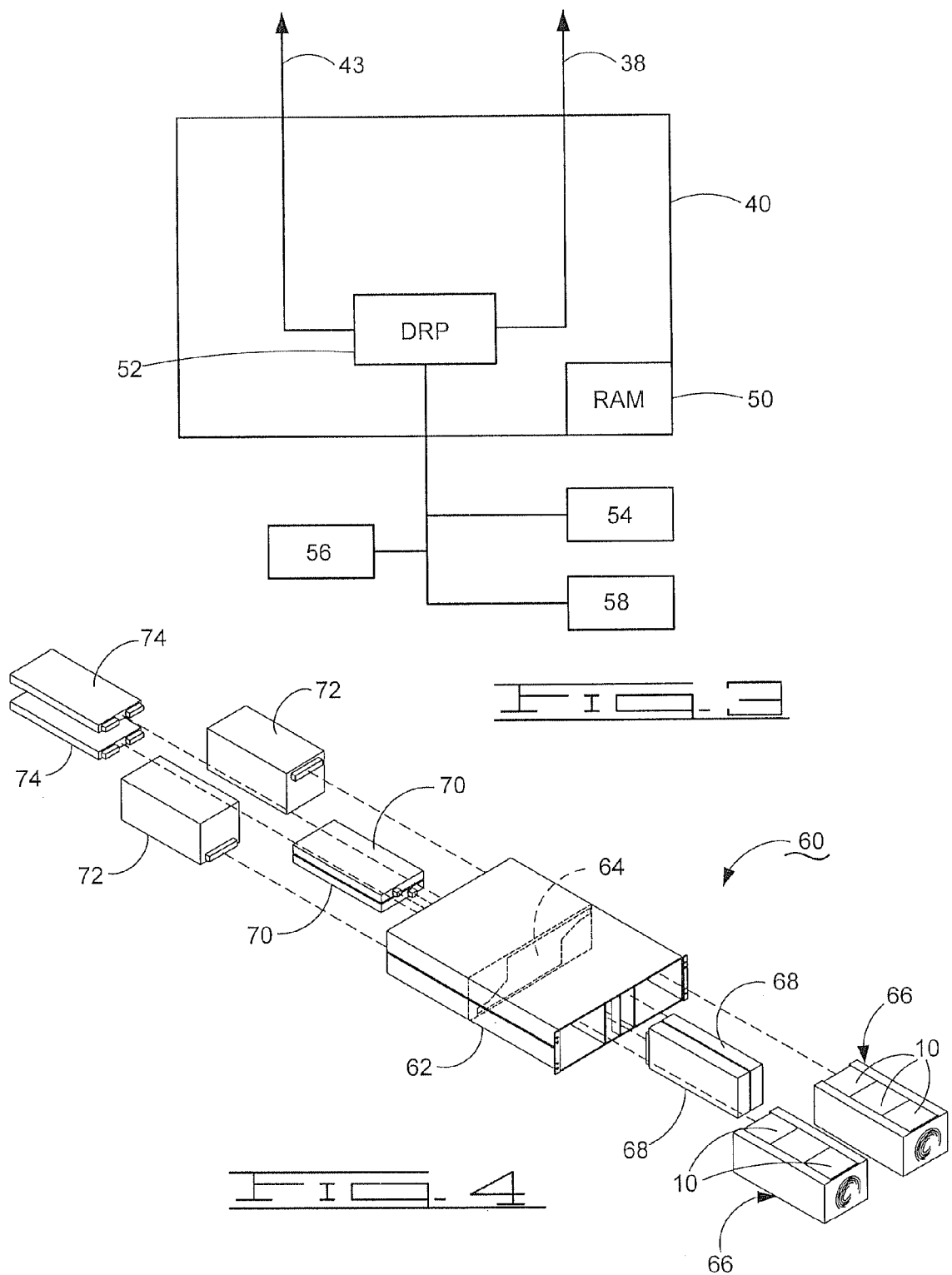

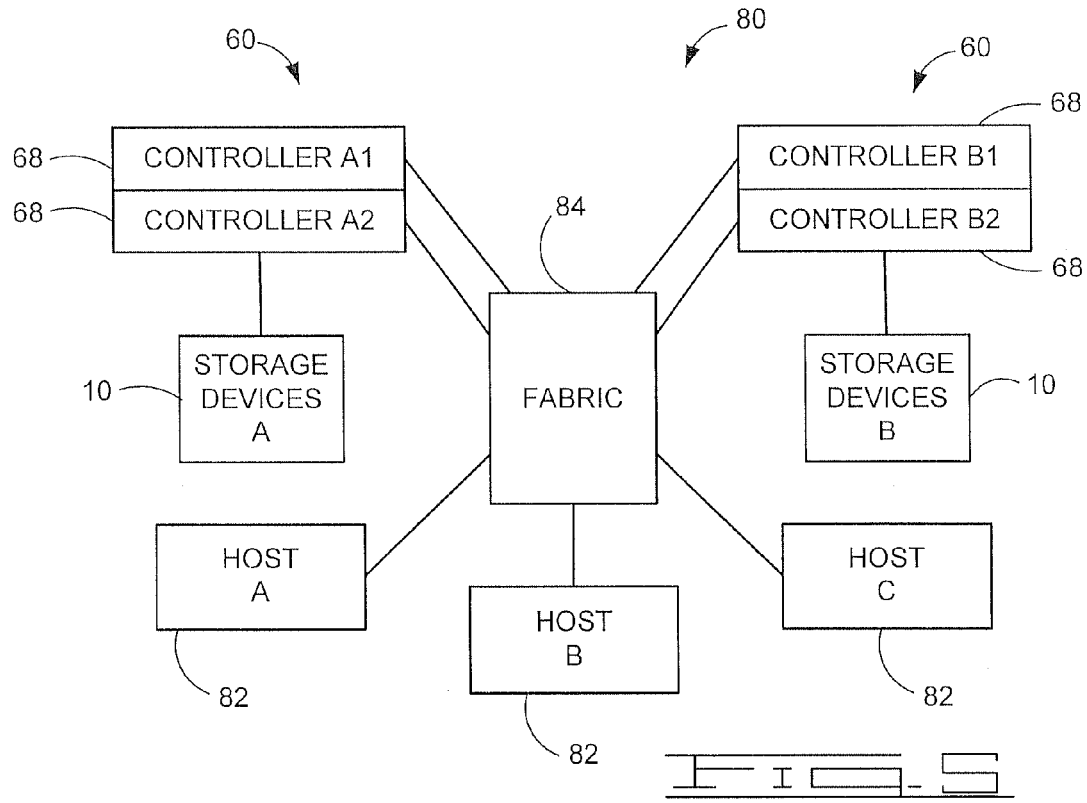
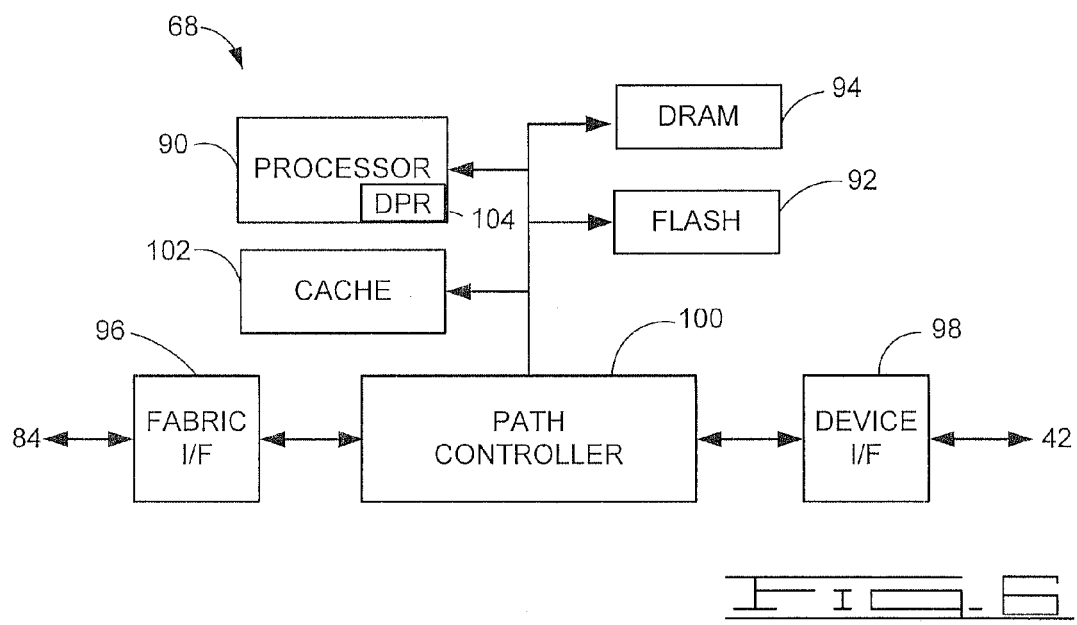

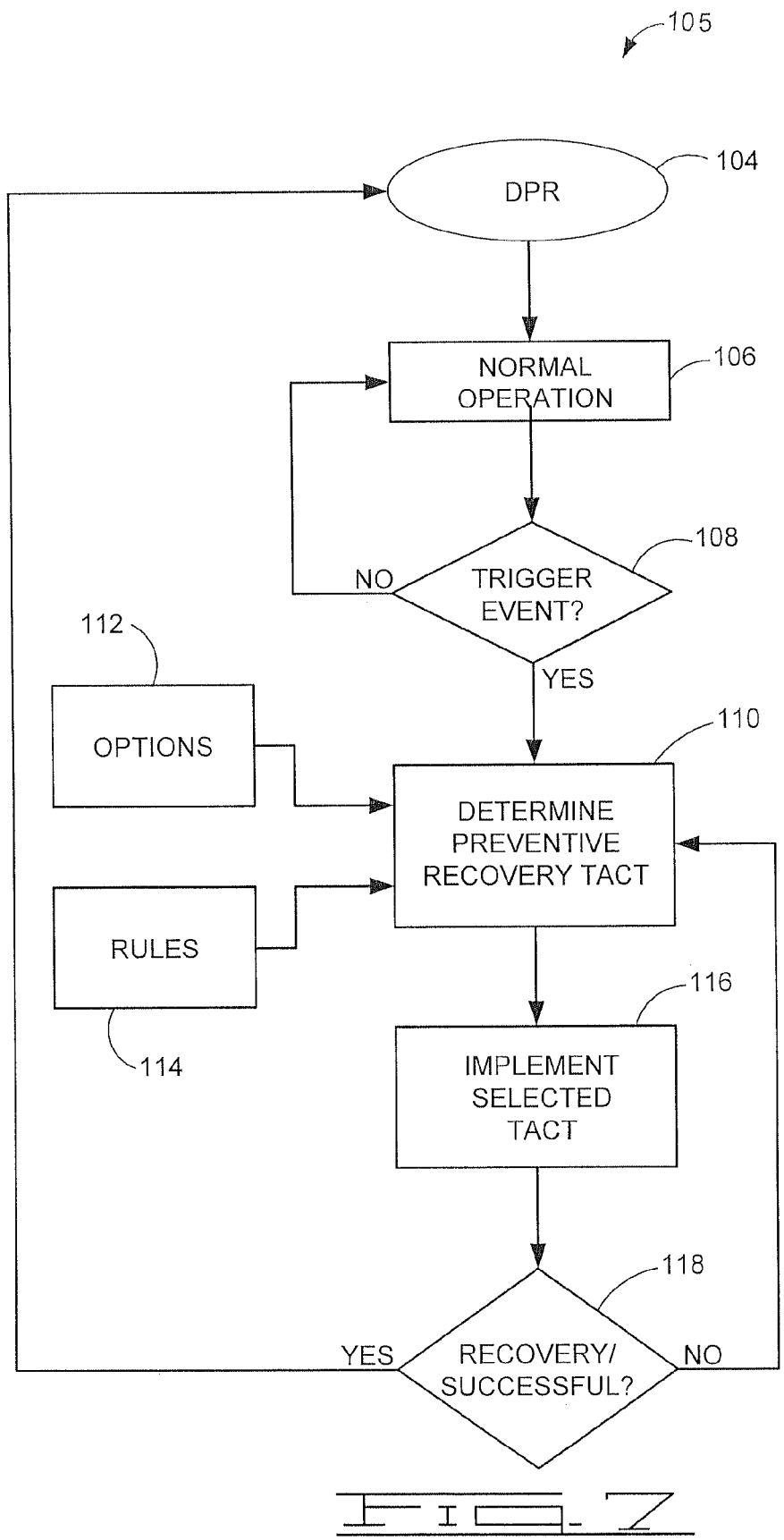

US 7,526,684 B2

DETERMINISTIC PREVENTIVE RECOVERY FROM A PREDICTED FAILURE IN A DISTRIBUTED STORAGE SYSTEM

RELATED APPLICATIONS

This application claims priority to U.S. Provisional Application No. 60/555,879 filed Mar. 24, 2004.

FIELD OF THE INVENTION

The embodiments of the present invention relate generally to distributed storage systems and more particularly without limitation to an apparatus and associated method for intelligently scheduling and servicing a predicted storage failure by a data storage subsystem.

BACKGROUND OF THE INVENTION

Generally, data storage systems have one or more data storage devices that store data on storage media such as a magnetic or optical data storage disc. In magnetic storage, for example, one or more of the magnetic discs are grouped together in a disc drive.

Preferably, the disc drive has a disc drive controller that is responsive to program instructions to unobtrusively monitor status and various operational parameters in order to predict a potential failure before it occurs. A widely employed Predictive Failure Analysis (PFA) tool is Self-Monitoring, Analysis and Reporting Technology (SMART). PFA purposively issues an indication when conditions exist or appear to be trending that are commensurate with a failure mode. PFA can be implemented by performing self-diagnostic tests, such as by comparing current parametric values against those stored in memory during manufacturing. PFA can also predict a failure based on the observed time rate of change of parametric values.

Disc drives with predictive failure capability, sometimes referred to as "SMART drives," can further employ Data Recovery Procedures (DRP) to preventively recover from a predicted failure. As an example, the SMART drive might indicate a predicted failure based on degraded signal-to-noise ratio. As a result, DRP circuitry might initiate a reposition of the MR head.

As storage capacity and flexibility demands have increased in recent years, the use of storage area networks (SAN) has proliferated. In a SAN, disc drives are grouped into an array and either used collectively as bulk storage or partitioned into discrete storage entities. Within the SAN it is advantageous to store data in a fault tolerant arrangement, such as in a Redundant Array of Independent Discs (RAID). This permits a recovery of corrupted data either by retrieving mirrored data or by reconstructing the data from stored parity information.

DRP and RAID both are aimed at maintaining highly reliable stored data. They do so, however, in different and many times conflicting ways. For example, DRP emphasizes in-situ repair of a failure condition, but at a relatively high cost of processing overhead that is necessary to recover from the predicted failure. SMART drives, being originally employed mainly in stand-alone systems, are often over-inclusive in predicting failures in that they tend to fault on the side of ensuring the data integrity. RAID systems, contrarily, are typically employed within a scalable storage capacity that can be grown if necessary to accommodate failures. Sparing, for example, is typical in RAID systems whereby extra disc drives are available for use in the event of a storage failure. When a threshold amount of the sparing has been utilized, it is more efficient to add additional sparing capacity or copy data from the failed drives and replace them than it is to perform in-situ recovery procedures.

What is needed is a solution that leverages both the predictive failure and in-situ advantages of DRP and the flexibility and efficiency advantages of RAID to minimize the instances of unscheduled maintenance in a data storage subsystem. It is to these advantages that the embodiments of the present invention are directed.

SUMMARY

As embodied herein and as claimed below, the embodiments of the present invention are generally directed to an apparatus and associated method for preventive recovery of data associated with a predicted storage failure.

Some embodiments of the present invention are directed to a data storage subsystem in a distributed storage system. The subsystem has a plurality of predictive failure analyzing data storage devices. The subsystem furthermore has a circuit that is responsive to a predicted failure indication by a data storage device in relation to predetermined rules stored in memory for deterministically initiating a preventive recovery either by a data recovery procedure in the data storage device or by a fault tolerant storage arrangement in the subsystem.

Some embodiments of the present invention are directed to a method for protecting stored data in a data storage subsystem having a plurality of data storage devices, comprising predicting a data transfer failure by one of the data storage devices; and analyzing the predicted failure in relation to predetermined rules to deterministically initiate a preventive recovery routine either by a data recovery procedure in the data storage device or by a fault tolerant storage arrangement in the subsystem.

Some embodiments of the present invention are directed to a data storage subsystem comprising a plurality of predictive failure analyzing data storage devices defining a storage subsystem, and means for recovering in accordance with predetermined rules stored in memory that deterministically minimize unscheduled maintenance in the subsystem.

These and various other features and advantages which characterize the claimed invention will become apparent upon reading the following detailed description and upon reviewing the associated drawings.

BRIEF DESCRIPTION OF THE DRAWINGS

FIG. 3 is a functional block diagram of the Data Recovery Program of the data storage device of FIG. 2.

FIG. 4 is an exploded isometric view of a data storage subsystem for a distributed storage system constructed of a plurality of the data storage devices of FIG. 1.

FIG. 5 is a functional block diagram of a distributed storage system utilizing the data storage subsystem of FIG. 4.

FIG. 6 is a functional block diagram of the controller of the data storage subsystem of FIG. 5.

FIG. 7 is a flowchart illustrating steps of a method for deterministic preventive recovery from a predicted failure in accordance with embodiments of the present invention.

DETAILED DESCRIPTION

Figure 1:
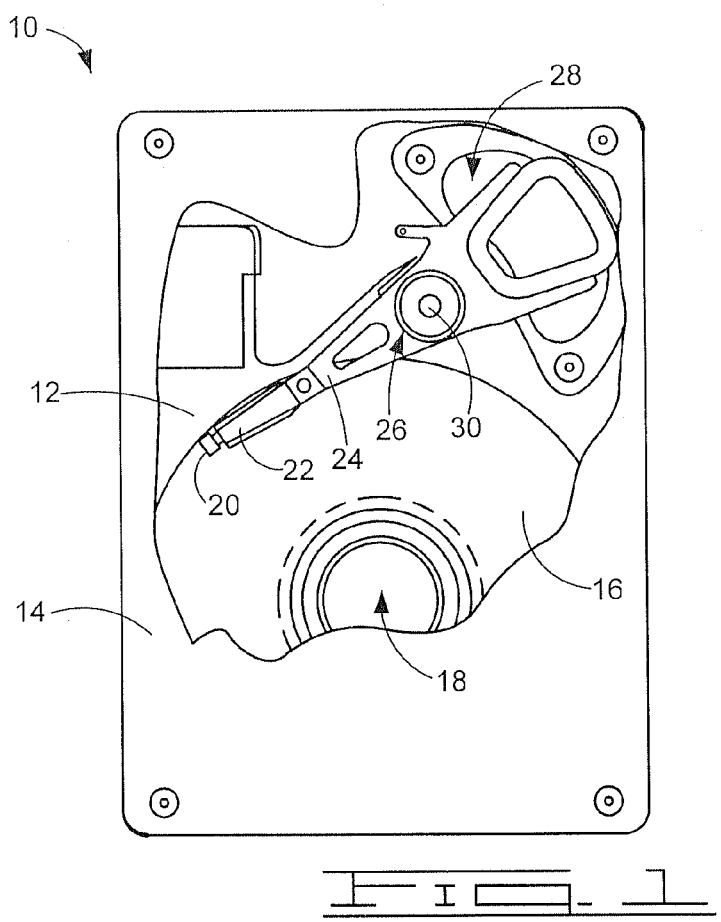
FIG. 1 is a plan view of a data storage device utilized in the embodiments of the present invention.

FIG. 1 is a plan view of a predictive failure analyzing data storage device 10 utilized in embodiments of the present invention. The data storage device 10 includes a housing formed from a base 12 sealingly engaged with a cover 14 (shown partially removed). A disc stack formed of one or more data storage discs 16 is mounted for rotation on a motor 18. Each disc surface is disposable in a data transfer relationship with a head 20. In the embodiments illustrated by FIG. 1, the heads 20 are supported by suspensions 22 which are, in turn, attached to arms 24 of an actuator 26. In the embodiments of FIG. 1, the actuator 26 is of the type referred to generally as a rotary type moving coil actuator positionably controlled by a voice coil motor 28. The voice coil motor 28 rotates the actuator 26 around a pivot shaft 30 to position the heads 20 adjacent a desired data track along a path between inner and outer diameters of the disc 16.

Figure 2:
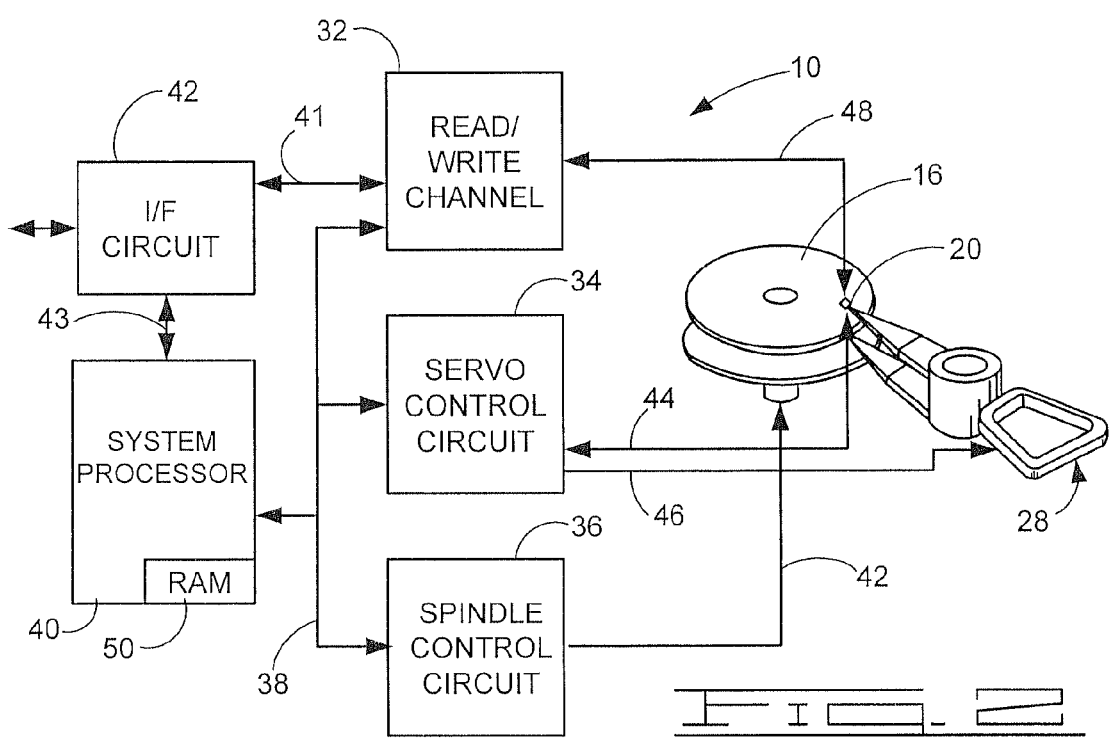
FIG. 2 is a functional block diagram of the data storage device of FIG. 1.

FIG. 2 is a functional block diagram of the data storage device 10 generally comprising a read/write channel 32, a servo control circuit 34, and a spindle control circuit 36, all connected by a control bus 38 to a processor 40. An interface circuit 42 is connected to the read/write channel 32 by bus 41 and to the processor 40 by bus 43. The interface circuit 42 serves as a data interface for the data storage device 10.

The spindle control circuit 36 controls the rotational speed of the motor 18 and discs 16 by signal path 42. The servo control circuit 34 receives servo position information from a head 20 by way of signal path 44 and, in response thereto, provides a correction signal by way of signal path 46 to an actuator coil portion of the voice coil motor 28 in order to position the heads 20 with respect to the discs 16. The read/write channel 32 passes data to be written to and read from the disc 16, respectively, by way of signal path 48 and the head 20.

Generally, in response to a write command from a host (not shown in FIG. 2) received by the processor 40 from the interface 42, the processor 40 controls the flow of data to be written to the disc 16 from the host to the interface 42 and the read/write channel 32. The read/write channel 32, in turn, provides a write current to the head 20 in order to write the data by selectively magnetizing selected data tracks on the disc 16. Alternatively, in response to a read command from the host over the interface 42, the head 20 detects flux transitions from the selected data tracks on the disc 16 and provides an analog read signal to the read/write channel 32, which in turn converts the analog read signal to digital form and performs the necessary decoding operations to provide data to the interface circuit 42 for output to the host. In controlling these operations of the data storage device 10, the processor 40 employs the use of programming instructions stored in memory 50.

FIG. 3 is a functional block diagram illustrating a Data Recovery Program (DRP) 52 feature of the data storage device 10. The DRP is responsive to one or more signal inputs 54, 56, 58 in accordance with predetermined instructions stored in memory in executing command sequences either over the bus 38 or the bus 43 to initiate corrective actions and/or communicate a predicted failure. The sensors 54, 56, 58 monitor the data storage device 10 for various disturbances that encumber data transfer, such as temperature and vibration disturbances. The inputs 54, 56, 58 can also be a data log of selected parametric values that can be routinely queried by the DRP 52. In some embodiments the sensors 54, 56, 58 and instructions resident in memory can be characterized as self-monitoring analysis and reporting technology (SMART).

Depending on the nature of the predicted failure, as determined by the DRP 52 in response to the inputs 54, 56, 58, the DRP 52 can initiate appropriate recovery actions. For example, in some cases the DRP 52 will initiate a "retry" sequence where the head 20 simply attempts to read the data again. In some cases a "seek away" sequence can be effective, whereby the head 20 is moved away from the selected track and then moved back to the selected track and the read step retried. In some cases more rigorous recovery actions can be necessary. For example, the DRP 52 might initiate an "adapt read channel" sequence whereby reparameterization of the read channel occurs. For example, parameters such as zero acceleration profile (ZAP) or servo notch optimization (SNO) might be adjusted. The DRP 52 might alternatively initiate a "change ECC level" sequence whereby a higher or lower scrutiny is applied by the error correction code algorithms. The DRP 52 might alternatively adjust the fly height of the head 20 or energize a writer heater in the head 20.

FIG. 4 is an exploded isometric view of a data storage subsystem 60 for use in a distributed storage system. The subsystem 60 has a shelf 62 supporting a backplane 64 for electrically connecting multi-disc arrays 66 of the data storage devices 10. The embodiments of FIG. 4 also indicate the subsystem 60 having primary and redundant controllers 68, battery pack backups 70, power supplies 72, and interfaces 74.

FIG. 5 is a functional block diagram of a distributed storage system 80, such as a storage area network (SAN), employing multiple data storage subsystems 60. The system 80 includes a number of host computers 82, respectively identified as hosts A, B, and C. In FIG. 5, the host computers 82 interact with each other as well as with a pair of data storage subsystems 60 (denoted A and B, respectively) via a fabric 84. The fabric 84 is preferably characterized as fibre-channel based switching network, although other configurations can be utilized as well, including the Internet.

The controller 68 and set of data storage devices 10 are preferably characterized as data storage devices operated as a redundant array of independent drives (RAID). That is, the controller 68 and data storage devices 10 preferably utilize a fault tolerant arrangement so that the various controllers 68 utilize parallel, redundant links and at least some of the user data stored by the system 80 is stored in a redundant format within at least one set of the data storage devices 10.

It is further contemplated that the A host computer 82 and the A data storage subsystem 60 can be physically located at a first site, the B host computer 82 and B storage subsystem 60 can be physically located at a second site, and the C host computer 82 can be yet at a third site, although such is merely illustrative and not limiting.

FIG. 6 illustrates a selected one of the controllers 68 in greater detail. The controller 68 can be embodied in a single integrated circuit, or distributed among a number of discrete circuits as desired. A main processor 90, preferably characterized as a programmable, computer processor, provides control in accordance with programming steps and processing data preferably stored in non-volatile memory 92 (such as flash memory or similar) and in dynamic random access memory (DRAM) 94.

A fabric interface (I/F) Circuit 96 communicates with the other controllers 68 and the host computers 82 via the fabric 84, and a device I/F circuit 98 communicates with the storage devices 10. The I/F circuits 96, 98 and a path controller 100 form a communication path to pass commands and data between the storage subsystem 60 and the host 82, such as by employing the cache memory 102. Although illustrated discretely, it will be understood that the path controller 100 and the I/F circuits 96, 98 can be unitarily constructed.

The subsystem has a deterministic preventive recovery (DPR) circuit 104 that is responsive to a predicted failure indication by a data storage device 10 (from interface 42) in relation to predetermined rules stored in memory for initiating corrective action either by the DRP 52 (FIG. 3) in the data storage device 10 or by the fault tolerant storage arrangement in the subsystem 60.

FIG. 7 is a flowchart illustrating process steps of a method 105 carried out by the DPR circuit 104. The sequence operates in the background during normal operations 106 until a trigger event 108 is detected indicating a predicted failure. As described above, the trigger event 106 is communicated from the data storage device interface 42 to the subsystem interface 98. In block 110 it is determined what preventive recovery tact will be initiated, based on available candidate options 112 and a set of predetermined rules 114.

The available candidate options 112 include the in-situ recovery routines in the DRP 52, as well as RAID recovery if the data associated with the predicted failure is protected by a fault tolerant storage scheme. More particularly, if the data associated with the predicted failure is presently backed up in a RAID, then the DPR circuit 104 might elect to copy the backed-up data to a new location in the RAID either permanently, and storage capacity associated with the predicted failure spared out, or it can be copied temporarily while recovery of the data associated with the predicted failure is attempted.

The rules 114 are preprogrammed instructions in memory that deterministically initiate preventive recovery routines either at the data storage device 10 control level, such as in the DRP 52, or at the subsystem 60 control level, such as in the RAID. The rules 114 can be fashioned to tune operating performance of the distributed storage system 80 as desired. For example, preferably the rules 114 would minimize the occurrences when a data storage device 10 would be pulled but no trouble found. Also, preferably the rules 114 would minimize if not eliminate occurrences of unscheduled maintenance.

As already mentioned, in some embodiments the rules 114 are determinative in relation to whether the predicted failure involves data that is stored redundantly in the RAID. If so, advantage can be taken of the fact that a backup copy of the data already exists, and so the rules 114 might opt to copy the backup data to ensure a redundant copy exists. The in-situ preventive recovery by the DRP 52 could then be scheduled during data storage device 10 idle time, diminishing the effect of the in-situ recovery on the distributed system 80 processing overhead. Alternatively, in conjunction with determinations associated with other rules 114, the data associated with the predicted failure might preferably be deleted and the storage capacity spared.

In some embodiments the rules 114 are determinative in relation to a defined criticality of the data associated with the predicted failure. For example, if the data is highly operation critical and not redundantly stored in the RAID, then the rules 114 preferably will signal the DPR circuit 104 to place a high priority on initiating an in-situ recovery procedure as soon as feasible. If, on the other hand, the data is expendable, or it is backed up in the RAID, the rules 114 may specify no action or low priority action in recovering it.

In some embodiments the rules 114 are determinative in relation to the extent of the predicted failure. For example, where the predicted failure involves a localized event, the rules 114 might preferably order an in-situ recovery that simply copies the data associated with the predicted failure to spare sectors. Where the predicted failure is more widespread, however, the rules 114 might preferably take action to spare out the data storage disc 16 or a portion thereof by copying the data associated with the predicted failure to another storage space.

In some embodiments the rules 114 are determinative in relation to empirical performance information about the data storage device 10 that indicated the predicted failure. For example, the rules 114 might compare the occurrence of a particular failure indication to quality assurance data, such as mean time before failure (MTBF) data or a Pareto distribution of observe failure modes, in deciding whether to initiate in-situ or RAID recovery.

The particular ordering and extent of rules 114 employed will vary depending upon many factors, such as the desired optimization of the distributed storage system 80, the extent of any RAID utilized, and the type and quality of data storage devices 10 employed. It would be impossible to enumerate all possible rule 114 definitions and combinations, and such is not necessary for a skilled artisan to understand the meaning and scope of the embodiments of the present invention.

After the preventive recovery tact is selected in block 110, control passes to block 116 where the selected tact is implemented. In decision block 118 it is determined whether the selected preventive recovery tact successfully recovered the predicted failure. If no, then control returns to block 110 where the tact may be repeated or changed; if yes, then control returns back to normal operation in block 106.

Summarizing, a data storage subsystem (such as 60) is provided for a distributed storage system (such as 80). The subsystem has a plurality of predictive failure analyzing data storage devices (such as 10) and comprises a circuit (such as 104) that is responsive to a predicted failure indication by a data storage device in relation to predetermined rules (such as 114) stored in memory (such as 94) for deterministically initiating a preventive recovery either by a data recovery procedure (such as 52) in the data storage device or by a fault tolerance storage arrangement in the subsystem.

A method (such as 105) is provided for protecting stored data in the data storage subsystem having the plurality of data storage devices, comprising predicting a data transfer failure by one of the data storage devices (such as 108); and analyzing the predicted failure in relation to predetermined rules to deterministically initiate a preventive recovery routine either by the data recovery procedure in the data storage device or by the fault tolerance storage arrangement in the subsystem (such as 110).

Generally, a data storage subsystem is provided comprising a plurality of predictive failure analyzing data storage devices defining a storage subsystem, and means for recovering in accordance with predetermined rules stored in memory that deterministically minimize unscheduled maintenance of the subsystem. The means for recovering can be characterized by selectively initiating a recovery either by the data recovery procedure in the data storage device of the plurality indicating the predicted failure or by the fault tolerance data storage arrangement in the subsystem. The means for recovering can be characterized by determining whether the predicted failure involves data that is stored redundantly in the subsystem. The means for recovering can be characterized by determining an assigned criticality of data associated with the predicted failure. The means for recovering can be characterized by determining an observed extent of the predicted failure. The means for recovering can be characterized by determining empirical performance information about the data storage device predicting the failure.

Significant improvements can be realized by the embodiments of the present invention as compared to previous attempted solutions. First, occurrences of unscheduled maintenance events can be substantially eliminated by early detection of predicted failures, and by early copying of data associated with the predicted failures to another portion of the data storage space. Second, processing overhead can be reduced by initiating the in-situ recovery techniques only at times when the data storage devices are otherwise idle. This reduces the number of pulled drives without adversely affecting the operating efficiency of the distributed storage system. Third, data reliability can be improved by recovery schemes that seek to always maintain a redundant copy of operation critical data.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular rules utilized to deterministically initiate preventive recovery may vary depending on the particular configuration and circumstances without departing from the spirit and scope of the present invention.

What is claimed is:

1. A data storage system comprising:
    a plurality of predictive failure analyzing data storage devices; and
    a deterministic preventive recovery circuit that simultaneously monitors each of the plurality in conjunction with normal data access operations with respect to an indicator of a predicted failure, wherein the indicator is not an actual data access failure, to apply predetermined rules stored in memory to data potentially affected by the predicted failure and thereby initiate a selected preventive recovery procedure.

2. The data storage system of claim 1 wherein each of the plurality comprises self-monitoring analysis and reporting technology.

3. The data storage system of claim 1 employing a redundant array of independent drives.

4. The data storage system of claim 1 wherein the rules are determinative in relation to whether the predicted failure involves data that is stored redundantly.

5. The data storage system of claim 1 wherein the rules are determinative in relation to a defined criticality of the data associated with the predicted failure.

6. The data storage system of claim 1 wherein the rules are determinative in relation to the extent of the predicted failure.

7. The data storage system of claim 1 wherein the rules are determinative in relation to empirical data transfer performance information from the data storage device indicating the predicted failure.

8. A method for protecting stored data in a plurality of data storage devices of a data storage system comprising:
    predicting a data transfer failure by each of the plurality of data storage devices;
    simultaneously monitoring each of the plurality in conjunction with normal data access operations for an indicator of a predicted failure from the predicting step, wherein the indicator is not an actual data access failure;
    analyzing the predicted failure in relation to applying predetermined rules to data potentially affected by the predicted failure; and
    initiating a selected preventive recovery procedure in response to the analyzing step.

9. The method of claim 8 wherein the predicting step is characterized by the data storage device comprising self-monitoring analysis and reporting technology.

10. The method of claim 8 wherein the analyzing step comprises recalling the predetermined rules from a memory.

11. The method of claim 8 wherein the analyzing step is characterized by the rules relating whether the predicted failure involves data that is stored redundantly.

12. The method of claim 8 wherein the analyzing step is characterized by the rules relating an assigned criticality of data associated with the predicted failure.

13. The method of claim 8 wherein the analyzing step is characterized by the rules relating to an observed extent of the predicted failure.

14. The method of claim 8 wherein the analyzing step is characterized by the rules relating to empirical data transfer performance information from the data storage device indicating the predicted failure.

15. The data storage system of claim 1 wherein the indicator of a predicted failure is based on output from a vibration sensor.

16. The data storage system of claim 1 wherein the indicator of a predicted failure is based on output from a temperature sensor.

17. The data storage system of claim 1 wherein the selected preventive recovery procedure comprises making a copy of redundant data and sparing the memory space associated with the predicted failure.

18. The data storage system of claim 1 wherein the selected preventive recovery procedure comprises reparameterization of a read channel.

19. The data storage system of claim 1 wherein the deterministic preventive recovery circuit comprises executable instructions stored in memory defining process steps for initiating the selected preventive recovery procedure.

* * * * *